(12) United States Patent
Lille

(10) Patent No.: US 6,947,246 B2
(45) Date of Patent: Sep. 20, 2005

(54) LARGE PROTRUSION RECORDING HEAD FOR CONTROLLED MAGNETIC SPACING RECORDING/READING

(75) Inventor: Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 201 days.

(21) Appl. No.: 10/652,297

(22) Filed: Aug. 29, 2003

(65) Prior Publication Data

US 2005/0046995 A1 Mar. 3, 2005

(51) Int. Cl.⁷ .......................... G11B 21/02; G11B 5/596; G11B 5/147
(52) U.S. Cl. .......................... 360/75; 360/126; 360/317; 360/78.04; 29/603.01
(58) Field of Search ........................ 360/75, 31, 78.04, 360/77.02, 126, 317; 29/603.01

(56) References Cited

U.S. PATENT DOCUMENTS

| | | | |
|---|---|---|---|
| 5,936,813 A | * | 8/1999 | Kim et al. ................. 360/320 |
| 5,991,113 A | | 11/1999 | Meyer et al. ................. 360/75 |
| 6,377,423 B2 | | 4/2002 | Dill, Jr. et al. ............. 360/126 |
| 6,510,025 B2 | | 1/2003 | Narumi et al. .............. 360/126 |
| 6,751,055 B1 | * | 6/2004 | Alfoqaha et al. ........... 360/126 |
| 2002/0122268 A1 | | 9/2002 | Bement et al. ............... 360/75 |
| 2002/0145829 A1 | | 10/2002 | Gates et al. ............. 360/235.7 |
| 2003/0058559 A1 | | 3/2003 | Brand et al. .................. 360/31 |
| 2003/0067717 A1 | | 4/2003 | Garfunkel et al. ........ 360/234.5 |
| 2005/0024764 A1 | * | 2/2005 | Hsiao et al. ................ 360/123 |

* cited by examiner

Primary Examiner—Andrew L. Sniezek
(74) Attorney, Agent, or Firm—Zilka-Kotab, PC

(57) ABSTRACT

A magnetic head structure having enhanced protrusion and having a first pole structure, a second pole structure forming a yoke with the fist pole, a coil structure disposed in the yoke, and a layer of partially cured polymer operatively coupled to the yoke. Also disclosed is a magnetic head having a first pole structure, a second pole structure forming a yoke with the fist pole, a coil structure disposed in the yoke, and a layer of at least partially insulative material operatively coupled to the read and/or write head for providing enhanced protrusion, the at least partially insulative material having a coefficient of thermal expansion higher than a coefficient of thermal expansion of fully cured hard bake novalac. Further embodiments include disk drive systems having the head structures described herein.

36 Claims, 10 Drawing Sheets

LARGE PROTRUSION RECORDING HEAD FOR CONTROLLED MAGNETIC SPACING RECORDING/READING

FIELD OF THE INVENTION

The present invention relates to magnetic heads, and more particularly, this invention relates to a magnetic head fabricated with materials providing increased ABS protrusion.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

The read element is generally made of a small stripe of multilayer magnetic thin films which have either magnetoresistance (MR) effect or giant magnetoresistance (GMR) effect, namely which changes resistance in response to a magnetic field change such as magnetic flux incursions (bits) from magnetic storage disk. Recorded data can be read from a magnetic medium because the external magnetic field from the recorded medium (the signal field) causes a change in the direction of magnetization in the read element, which in turn causes a change in resistance in the read element and a corresponding change in the sensed current or voltage.

FIGS. 1 and 2A–2C illustrate examples of a conventional composite type thin-film magnetic head 10. FIG. 1 is a cross-sectional view of the head 10 perpendicular to the plane of the air bearing surface (ABS). FIG. 2A shows the slider 11 flying above the disk 13.

In these figures, the reference numeral 12 denotes a substrate, 15 denotes an undercoating, 20 denotes a lower shield layer of the MR reproducing head part, 21 denotes an upper shield layer of the MR head part, which can also act as a lower pole of an inductive recording head part, 22 denotes a MR layer provided through an insulating layer 23 between the lower shield layer 20 and the upper shield layer 21, 26 denotes a write gap layer, 27 denotes a lower insulating layer deposited on the upper shield layer 21, 28 denotes a coil conductor formed on the lower insulating layer 27, 29 denotes an upper insulating layer deposited so as to cover the coil conductor 28, 30 denotes an upper pole, and 34 denotes a pad that would connect the read or write coil to other components in the drive. In general, there would be a plurality of pads 34 on the slider 11. Note that the pad 34 connects directly to the coil conductor 28. The upper pole 30 is magnetically connected with the lower pole (upper shield layer) 21 at its rear portion so as to constitute a magnetic yoke together with the lower pole 21.

As recording density and data transfer rate have increased over the past a few years, critical dimensions in the recording device such as track width read and write gap and coil size have decreased accordingly. Also, the fly height between the air bearing surface (ABS) 32 and the media have become smaller and smaller. For reference, recording heads with 40 gb/in$^2$ products typically have fly heights of about 12 nanometers. This fly height will continue to decrease in the future. This reduction in head critical dimensions and fly height, while beneficial to magnetic performance, also comes with cost on thermal and mechanic reliability.

The thermal expansion coefficients for the substrate and the various layers of the head differ, so when the head becomes heated during use, some layers will begin to protrude from the ABS. FIG. 2B depicts the head 10 when the write element is not operating, and particularly that the spacing may vary due to recession of various materials and structure due to the ABS fabrication process. FIG. 2C is a detailed diagram of the heat transfer and protrusion profile of the head 10 when the head is active (e.g., when the write coil is energized). One issue with heads is that the write-induced protrusion of the pole and overcoat can cause head-media contact, resulting in errors. This can affect the write head signal to noise ratio with alterations in the magnetic spacing between the head and the media. In older generations of heads, this was not a problem because the head was flying much higher and device size was bigger leading to easier heat dissipation. However, the coil length in modern heads has decreased to accommodate high data rate advancement. Consequently, ohmic heating from write current through coil and eddy current in write pole/yoke and magnetic hysteresis of magnetic materials are confined in a tiny space near the ABS, which typically lead to unacceptable thermal protrusion and drive reliability concerns. As can be seen in FIG. 2C, the top write pole 30 and overcoat protrude from the ABS 32 toward the media 13. The protrusion amount can be 1–4 nanometers.

The thermal expansion is proportional to the temperature, so it would be desirable to reduce the temperature in order to limit the thermal expansion. This in turn would reduce protrusion.

There are several factors that limit the reduction in slider flying height. These factors might reasonably be ignored at flying heights of above 20 nanometers, but would become major concerns at flying heights on the order of <5 nanometers. These include variations in the sliders themselves, variations in the structure that supports the sliders, and media surface roughness.

More particularly, normal tolerances in slider fabrication lead to structural variations among the sliders in any given batch. Consequently, the flying heights of sliders in the batch are distributed over a range, although the flying height of each slider individually is substantially constant.

Variations in supporting structure occur primarily in the transducer support arm, the suspension or gimballing structure, slider geometry and load arm. These variations influence the flying height, and the nature of a given slider's reaction to any disturbances, e.g. due to shock or vibration.

Disk roughness also becomes more of a problem at lower slider flying heights. With maximum peaks more likely to protrude into a normal range of slider operation, the probability of unintended and damaging slider/disk contact increases. The risk of damage from these discontinuities is greater at lower slider flying heights.

Thermal effects also are exaggerated by minute slider flying heights. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials. Reduced flying heights increase the need to take thermal expansion and thermally induced elastic deformation into account.

One proposed design of a slider would drag on the disk surface, thereby more precisely fixing a head/disk spacing based on a peak roughness of the disk surface. Any improvement in setting the transducer/recording surface gap, however, would be at the cost of excessive wear to the slider, media recording surface, or both.

What is needed is a way to allow the head to fly at a higher physical spacing when the head is not in a read or write mode, thereby protecting the head, yet be in close proximity to the media during reading and/or writing for allowing heads to read and write with reduced track width, bit length and error rate.

SUMMARY OF THE INVENTION

The present invention overcomes the drawbacks and limitations described above by providing a magnetic head structure having enhanced protrusion. The magnetic head according to one embodiment includes a first pole structure, a second pole structure forming a yoke with the fist pole, a coil structure disposed in the yoke, and a layer of partially cured polymer operatively coupled to the write head, read head, or both.

The partially cured polymer can be a silicon-containing polymer, preferably a silsequioxane such as methylsilsesquioxane or hydrogen silsesquioxane. The polymer can also be a hybrido-organo siloxane polymer. The layer of partially cured polymer may be positioned anywhere in the head, including substantially in or substantially out of the yoke. Exemplary placement of the layer of partially cured polymer include a layer surrounding the coil structure(s), between the coil structure and an air bearing surface of the head, between a read element of the head and the yoke, on an opposite side of a read element of the head relative to the yoke, etc.

Preferably, a portion of an air bearing surface of the head expands outwardly from the head in an amount of at least about 50% greater than, and ideally at least about 100%, of a protrusion of the air bearing surface in the head if hard bake novolac or alumina were used in place of the layer of partially cured polymer after about a one millisecond write cycle.

According to one embodiment, a heating element may be operatively coupled to the yoke. In another embodiment, the coil structure has been formed by a damascene process.

A magnetic head according to yet another embodiment includes a first pole structure, a second pole structure forming a yoke with the fist pole, a coil structure disposed in the yoke, and a layer of at least partially insulative material operatively coupled to the yoke for providing enhanced protrusion, the at least partially insulative material having a coefficient of thermal expansion higher than a coefficient of thermal expansion of fully cured hard bake novalac.

Further embodiments include disk drive systems having the heads described herein.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
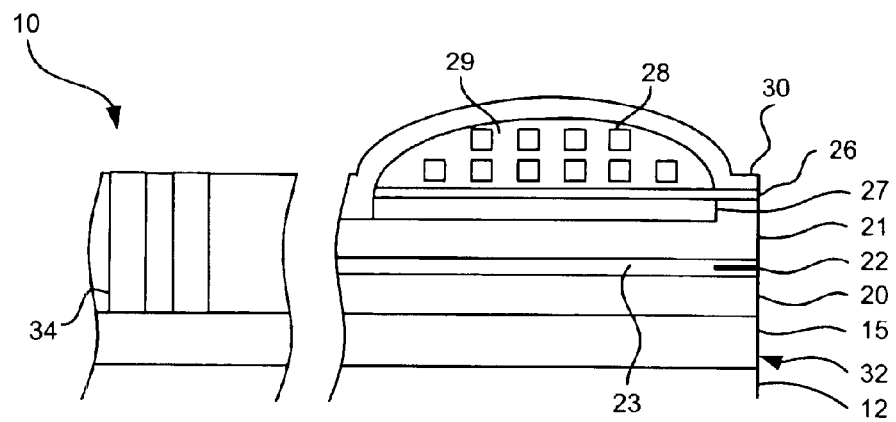
FIG. 1 is a cross-sectional view of a conventional composite type magnetic head, perpendicular to the plane of the ABS.
Figure 2A:
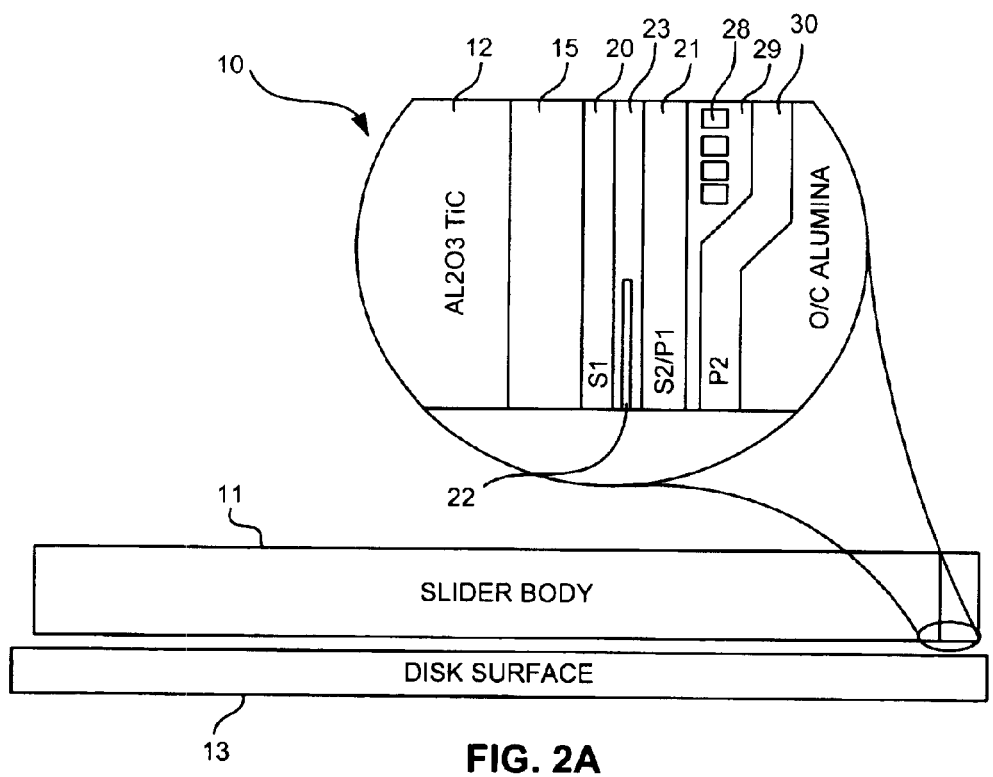
FIG. 2A shows a cold slider flying above the disk.
Figure 2B:
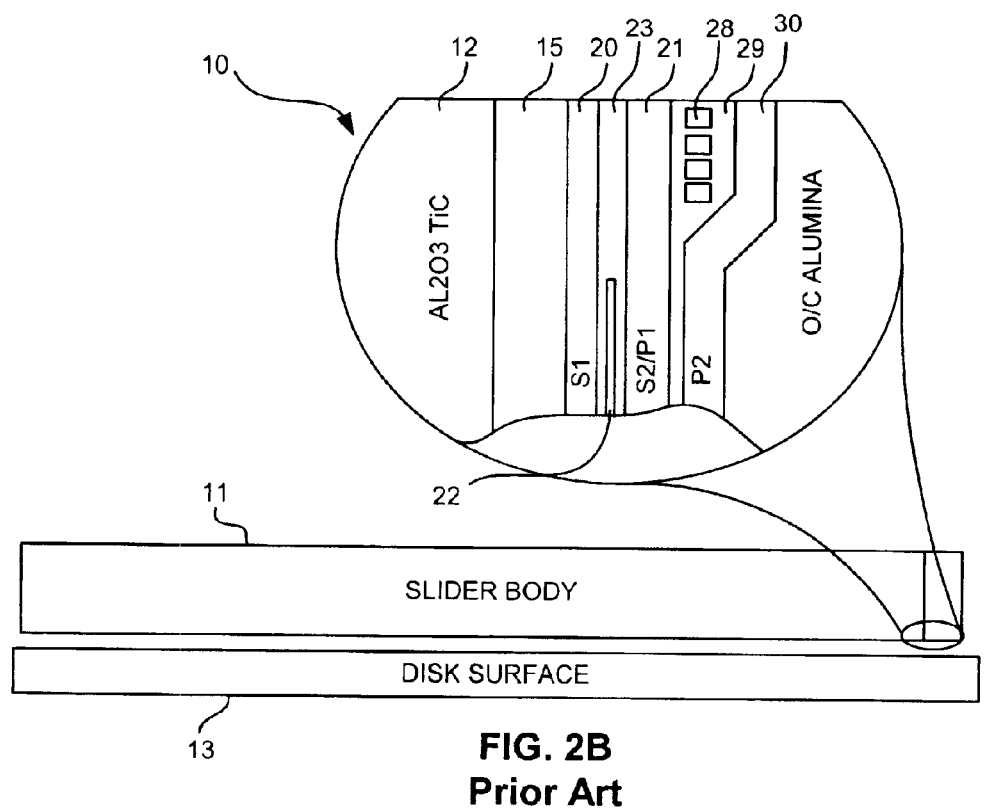
FIG. 2B depicts the discontinuity of a head caused by recession of various materials and structure due to the ABS fabrication process.
Figure 2C:
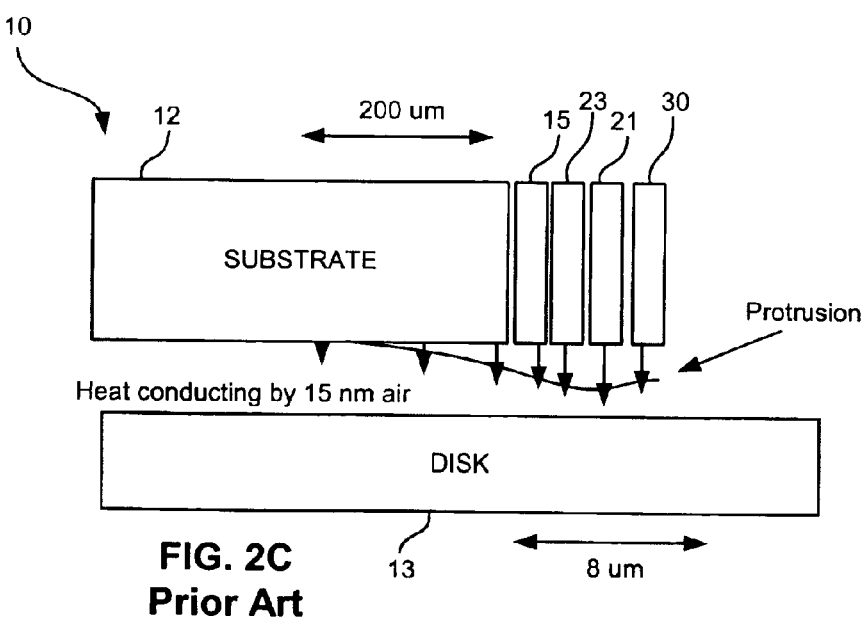
FIG. 2C is a detailed diagram of the heat transfer profile and protrusion profile of a head.
Figure 3:
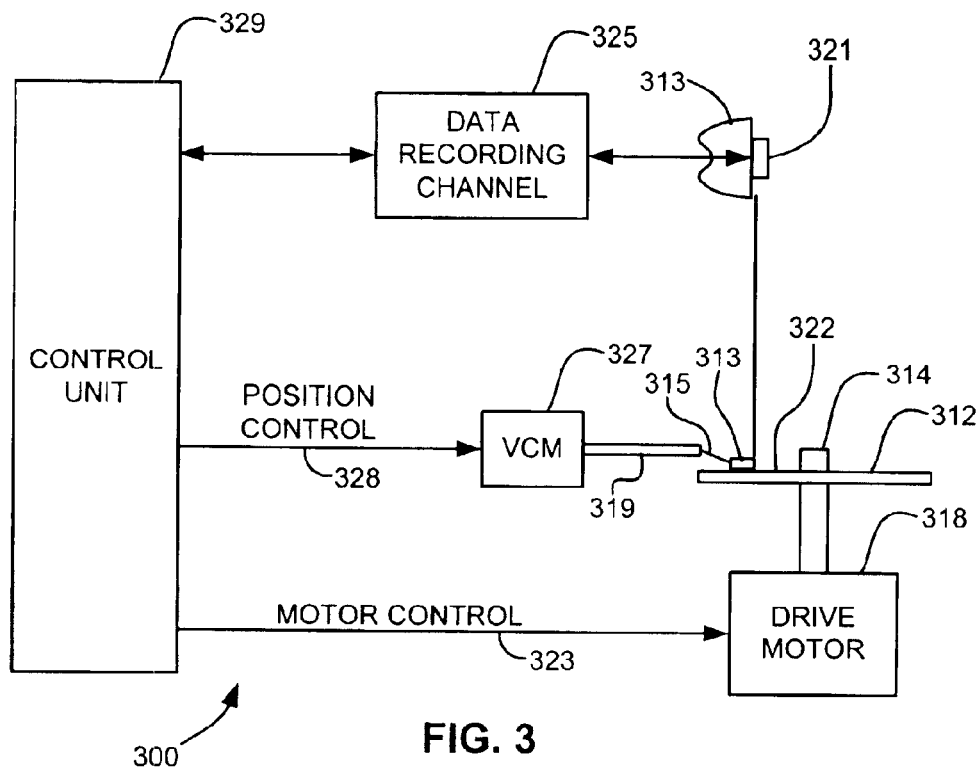
FIG. 3 is a perspective drawing of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
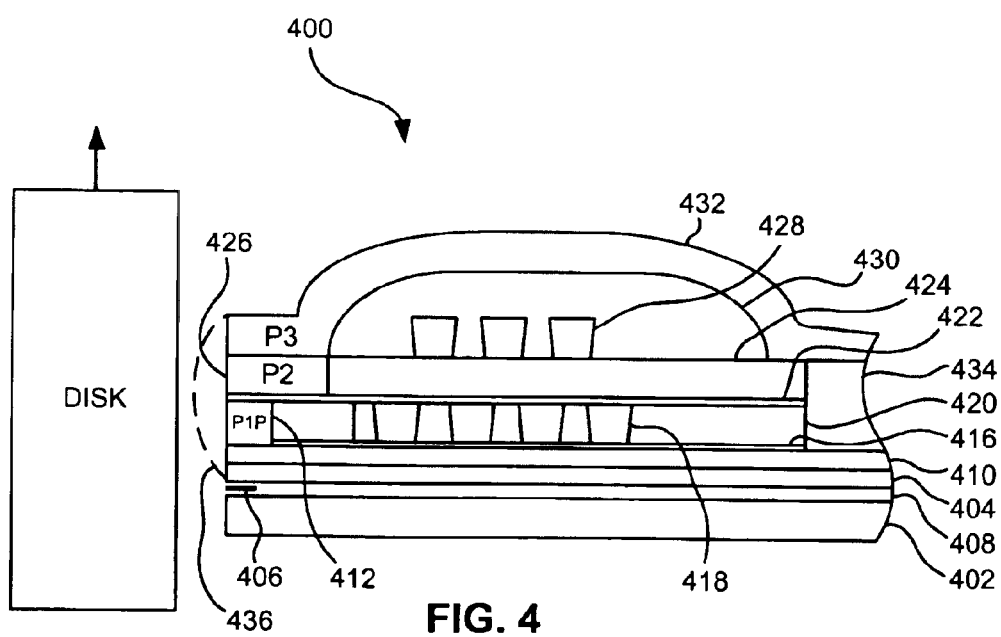
FIG. 4 is a partial cross sectional view of a head according to one embodiment.

FIG. 4 illustrates a partial cross section of a head 400 according to one embodiment. In FIG. 4, the reference numeral 402 denotes a lower shield layer (S1) of the MR reproducing head part, 404 denotes an upper shield layer (S2) of the MR head part, 406 denotes a MR layer provided through an insulating layer 408 between the lower shield layer 402 and the upper shield layer 404, 410 denotes a lower pole (P1) of an inductive recording head part, 412 denotes a P1 pole tip (P1P), 416 denotes a lower insulating layer deposited on the lower pole 410, 418 denotes a first coil conductor formed on the lower insulating layer 416, 420 denotes a first insulating layer deposited so as to cover the first coil conductor 418, 422 denotes a recording gap layer, 424 denotes an upper spacing layer positioned between above the recording gap layer 422, 426 denotes a second pole (P2), 428 denotes a second coil conductor formed on the upper insulating layer 424, 430 denotes a second insulating layer deposited so as to cover the second coil conductor 428, and 432 denotes an upper pole (P3). The upper pole 432 is magnetically connected with the lower pole 410 by a back gap 434 so as to constitute a magnetic yoke together with the lower pole 410. Note that other exemplary designs include a single coil conductor, P2 426 and P3 432 may be a continuous structure, additional layers may be added, etc. The head 400 shown in FIG. 4 and the examples below are formed by conventional processes and of conventional materials unless otherwise indicated.

As mentioned above, an artifact during operation of any type of head is thermal expansion. The coils are energized to induce writing. This creates heat, which heats the surrounding materials and causes them to expand according to their thermal expansion coefficients per unit power sent to the coils. The expansion results in protrusion, at least near the write portion of the head. For example, short yoke inductive write heads have a pole tip protrusion where the power density of the inductive coil is large and thus heats the head. The dashed line 436 of FIG. 4 illustrates protrusion of the air bearing surface (ABS) of the head 400.

By increasing the thermal expansion or the protrusion effect, this allows the head design to do at least one of two things: fly at a higher physical spacing while the head is off thereby reducing any head-disk interface issues and/or reduce the power density that needs to be introduced into the head to achieve the same protrusion. The advantage of heating the head on demand to cause a protrusion is that it affects the magnetic spacing of the head. This in turn allows the head to fly at a higher physical spacing when the head is not in a read or write mode yet be in close proximity to the media during reading and/or writing. Thus, manufacturers can design the head so that the space between the ABS and disk media when the head is hot is known, allowing the designer to reduce this space and obtain greater performance.

In conventional processing, the insulation 420, 430 for the coils 418, 428 are constructed of a hard bake, which is a polymer such as baked novolac resist baked to a very high temperature until it has no more photoactive compounds. This cured resist becomes a good polymer insulator but has a low coefficient of thermal expansion relative to other polymers, but large relative to many oxides.

Rather than attempt to reduce protrusion, the present invention seeks to cause controlled expansion using materials with particular thermal expansion coefficients to create controlled protrusion to a known amount. To make the protrusion larger than a standard head width, a material that has a high thermal expansion coefficient is used.

Accordingly, the present invention uses materials with higher coefficients of thermal expansion than conventional materials operatively. Such materials are operatively coupled to the yoke. By "operatively coupled" as used herein, what is meant is that the polymer layer is somehow coupled to the overall yoke structure via physical contact with the yoke itself, or by contact with other elements or combinations of elements that are ultimately in contact with the yoke or read head. Preferred materials include high thermal coefficient of expansion materials that are not completely cross linked or baked.

Preferred embodiments of the present invention uses a high silicon-containing polymer for the insulating layers 420, 430 as opposed to a photoresist based polymer or other insulator, as is currently used in state of the art processes. The polymer used is heated but not completely cured, such that it creates a near-pure Si—O matrix. Such material has a large yet measurable coefficient of thermal expansion. The preferred material is a silsesquioxane, such as methylsilsesquioxane (MSSQ or MSQ), hydrogen silsesquioxane (HSQ), and other polymers containing a silsesquioxane segment. Another suitable material is hybrido-organo siloxane polymer (HOSP). The material can also be a partially cured photoresist.

For simplicity, the remaining description shall refer to use of MSSQ, it being understood that the various embodiments described herein may use any material having a higher coefficient of thermal expansion than traditional materials, including the aforementioned materials.

To completely transform MSSQ into a near-pure Si—O matrix would require a temperature of at least 400° C. However, a bake of thick MSSQ to less than about 225° C., and preferably below about 225° C. for 11 hours, will drive a cross-linking of the polymer sufficiently to make it insoluble in developer or hot n-methylpyrolidone (NMP) but will not completely cure the MSSQ. This also allows the option of double apply the MSSQ to achieve a thicker polymer if desired.

MSSQ functions as a dielectric in the head, and may form a portion or all of, or be positioned between, many of the layers shown in FIG. 4. For example, the MSSQ can be positioned such that it surrounds at least two sides of the coils. Also, the first and/or second insulating layers 420, 430 in the head 400 of FIG. 4 can be MSSQ. Note however that MSSQ placement is not limited to positioning around the coils 418, 428, and can be positioned substantially in and/or outside the yoke, i.e., the greater portion of the layer of polymer is positioned in or outside the yoke. MSSQ can also form the upper spacing layer 424 between the two layers of coils 418, 428. Other noninclusive examples of MSSQ placement is below the lower shield layer 402, as the shield layer 408 between the lower shield layer 402 and the upper shield layer 404, between the upper shield layer 404 and lower pole 410, as the recording gap layer 422, and/or above the upper pole layer 432. Again, this list is noninclusive, and the MSSQ can be used in any desired combination. The important factor is to create a protruding effect, so the MSSQ can be positioned anywhere in head structure where it will carry the rest of head structure into the ABS.

Figure 5:
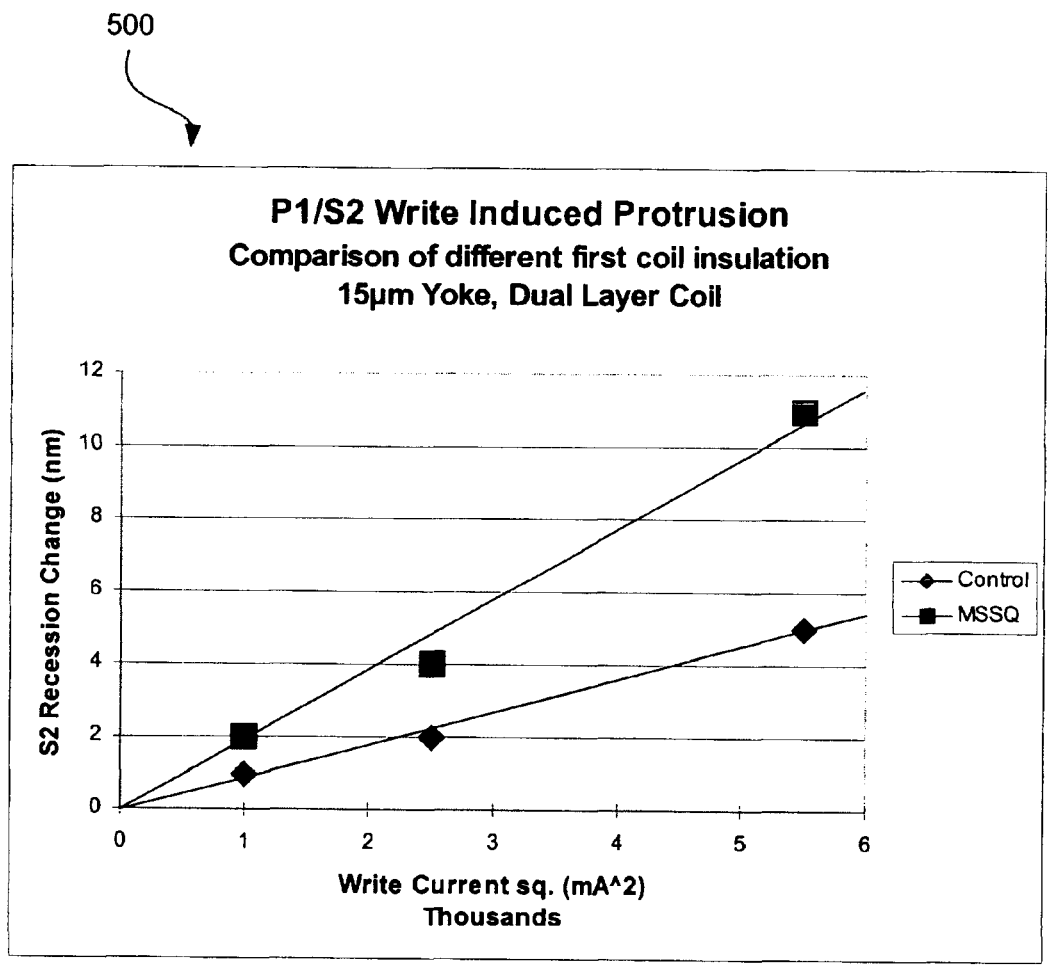
FIG. 5 is a chart graphically depicting a comparison of write-induced protrusion of a P1/S1 layer of a prior art head and a head according to one embodiment.
Figure 6:
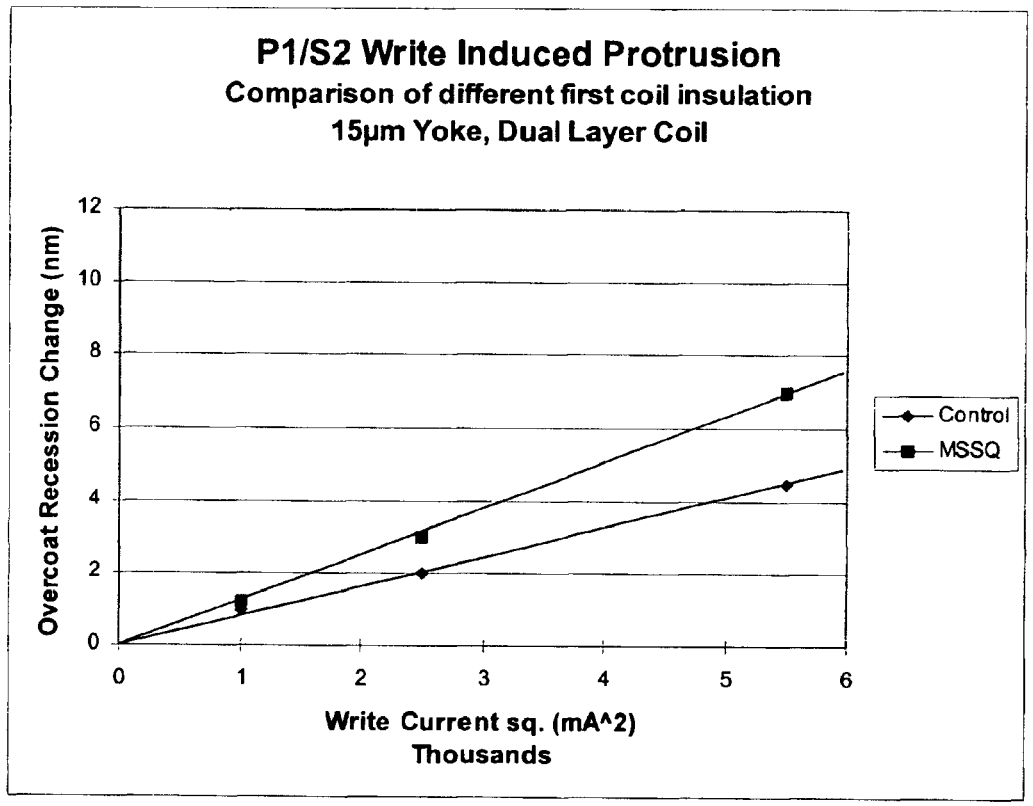
FIG. 6 is a chart graphically depicting a comparison of write-induced protrusion of an overcoat layer of a prior art head and a head according to one embodiment.

In one experiment, the MSSQ was used in place of standard materials (hard bake novalac) on only half of the coil insulation around the first (lower) coil on a standard inductive write head similar to the head 400 shown in FIG. 4, resulting in about a doubling of protrusion at the ABS for virtually the same amount of power delivered to the head. FIG. 5 is a chart 500 showing results of the experiment, indicating that the protrusion induced during the write cycle increased from about 5 nm to about 11 nm for the same amount of input current into the head. Similarly, as shown in the chart 600 of FIG. 6, protrusion of the overcoat increased by about 50%. From the charts, it can be seen that most protrusion is found around the coils, and less around the overcoat. However, this relationship may change with a different location of the polymer or heating source.

FIGS. 7A–7I graphically depict an illustrative method of fabrication for a coplanar P1 pedestal and coil structure that will be planarized after inclusion of MSSQ as the inter-coil dielectric.

Figure 7A:
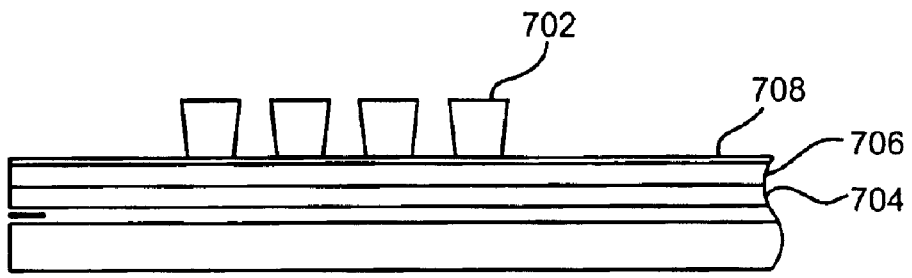
FIGS. 7A–7I graphically depict an illustrative method of fabrication for a coplanar P1 pedestal and coil structure according to one embodiment.

FIG. 7A illustrates formation of a coil conductor 702 on a lower pole 706. As shown, the head already has S2/P1 layers 704, 706 formed. Then a layer of alumina 708 is added to isolate processing above it to protect the P1 layer 706. A seed layer of copper (not shown) or other suitable material is added, and copper coils 702 are formed by plating. Then seed from between the coils 702 is removed, leaving the formed coils 702.

Figure 7B:
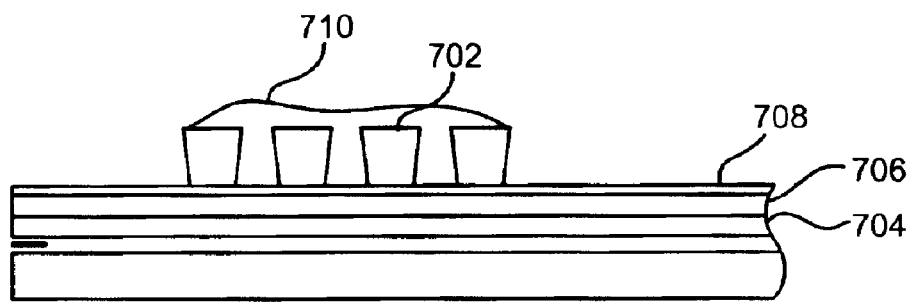

As shown in FIG. 7B, a layer of photoresist or hard bake 710 is added to the coils 702 to protect the coils 702 during further processing.

Figure 7C:
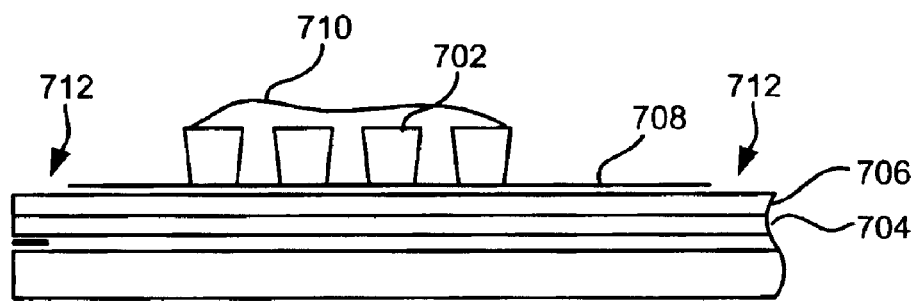

Referring to FIG. 7C, after the coils 702 are protected, vias 712 are etched into the layer of alumina 708 at the front and back of the structure. The vias 712 provide sites to which the P1P pole and back gap will be added.

Figure 7D:
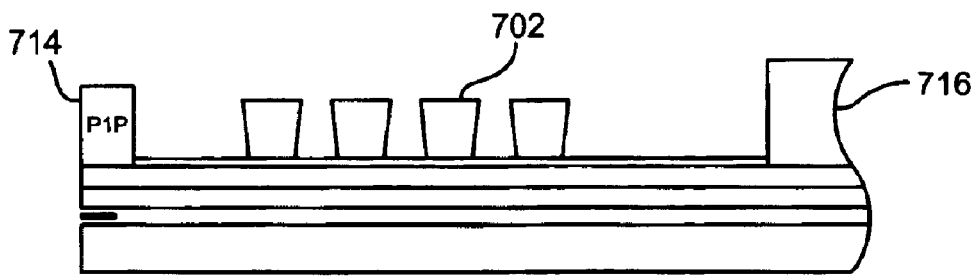

As shown in FIG. 7D, the hard bake 710 is removed by stripping it from the structure with oxygen-containing plasma, etc. This removes all of the polymer 710.

Figure 7E:
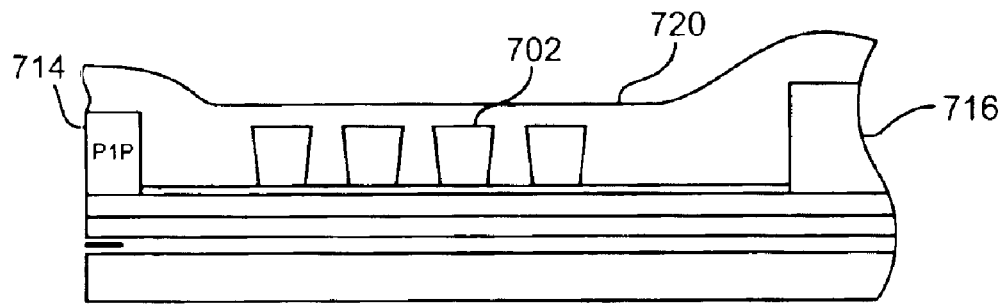

MSSQ 720 is added to the structure, as depicted in FIG. 7E. Spincoating is performed by spinning the wafer and then applying the material, which wicks across the surface in a thin uniform coating. This fills in all voids between the P1P pole 714 and back gap 716.

Chemical mechanical polishing (CMP) can then be used to planarize the structure to the desired height. The result is an encapsulated coil, as shown in FIG. 7I.

Figure 7F:
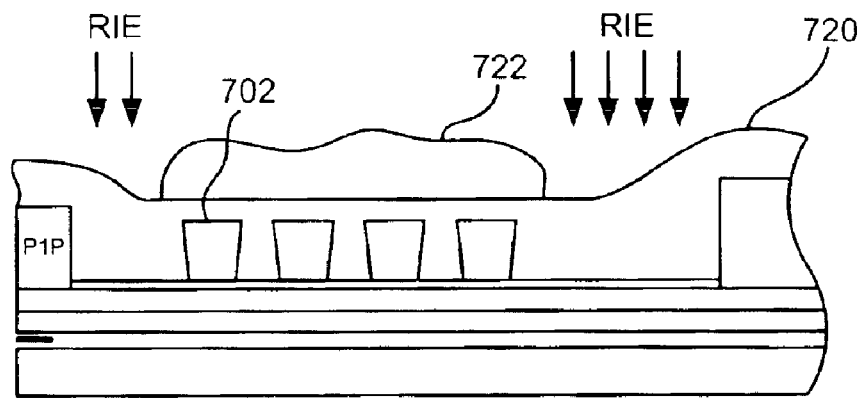
Figure 7G:
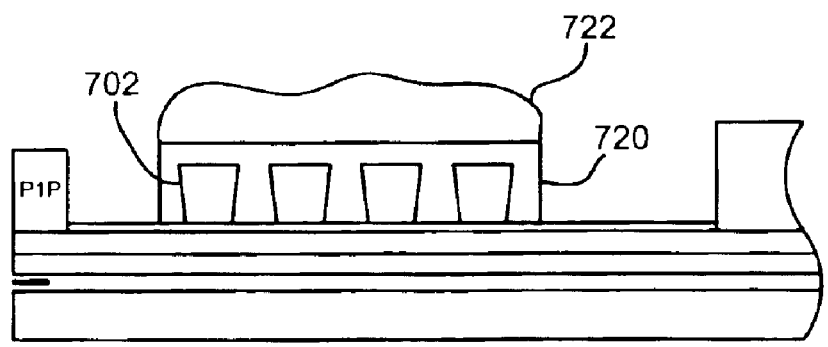

Referring to FIG. 7F, resist 722 is formed on the MSSQ 720 over the coils 702. Then reactive ion etching (RIE) processing is performed using Fluorine-containing plasma, or combination of these. This removes the MSSQ from the field, leaving an island of polymer covering the coils 702. The resulting structure is shown in FIG. 7G.

Figure 7H:
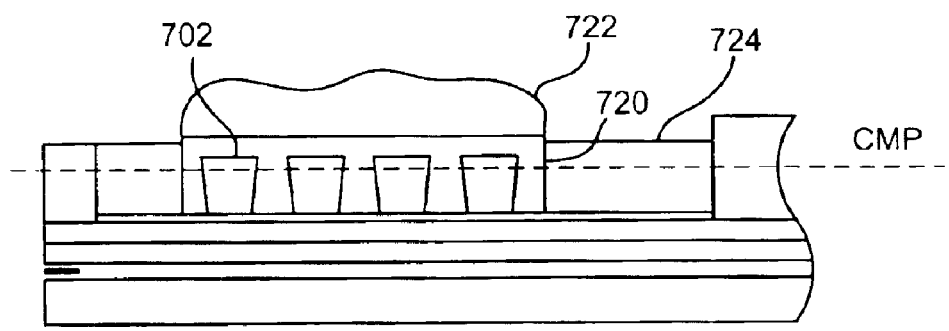
Figure 7I:
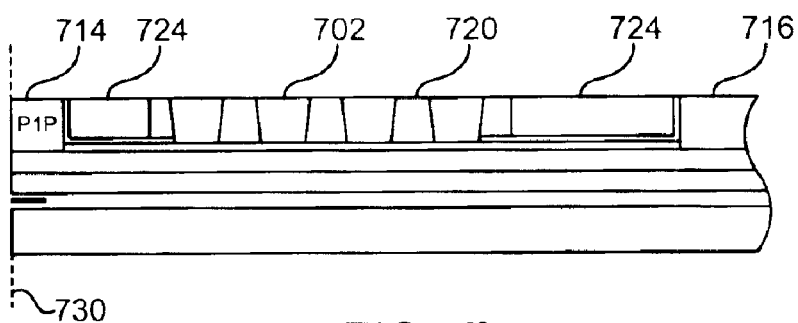

As shown in FIG. 7H, the field is filled with alumina 724. To provide even greater protrusion, MSSQ can be positioned in the field instead of alumina. Then the structure is processed by CMP processing to remove any material above coils 702. FIG. 7I depicts the final structure, with encapsulated coils 702.

As a side note, the MSSQ 720 could cover other or larger areas on the wafer. Also, it is preferred that the polymer not remain at the ABS plane 730 on the wafer. This polymer or other polymers may interfere with the head-disk interface (HDI).

FIGS. 8A–8E depict a method of forming a head with coils formed using a damascene process. This method produces a structure that retains all of the advantages of the structures described above and will produce a substantially similar coil structure.

Figure 8A:
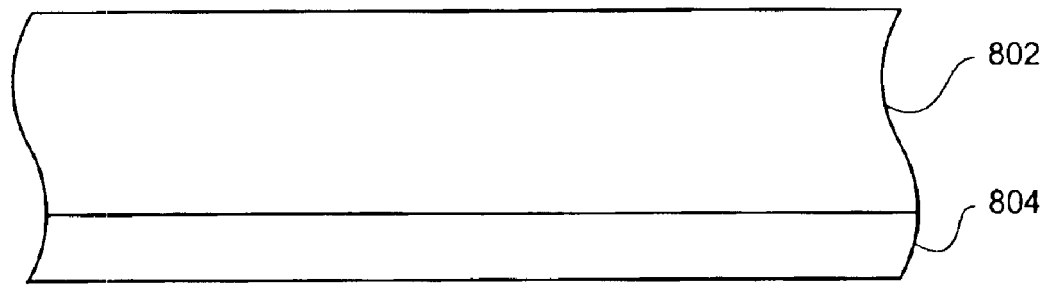
FIGS. 8A–8E graphically depict an illustrative method of forming a head with coils formed using a damascene process according to one embodiment.

FIG. 8A illustrates a portion of a head with a layer of MSSQ 802 formed full film on a layer of alumina 804. To aid in understanding, the layer of alumina can be a layer such as the lower insulating layer 416 or the upper spacing layer 424 shown in FIG. 4.

Figure 8B:
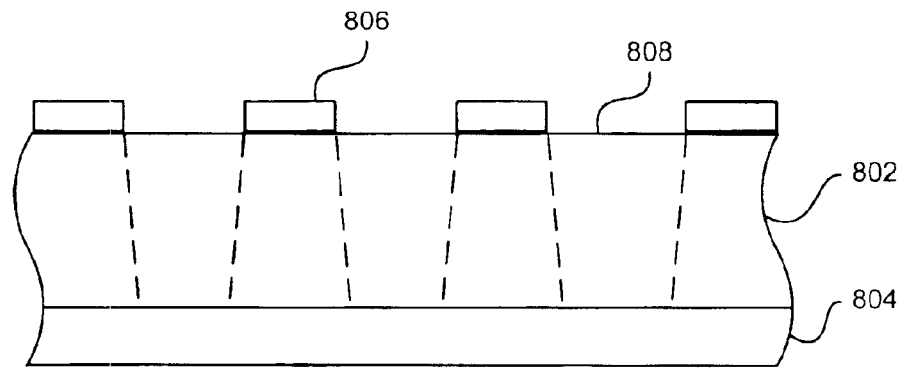

As shown in FIG. 8B, a RIE mask 806 is formed on the layer of MSSQ 802 via conventional processes to protect portions of the MSSQ 802 that will form insulators between the coils. The mask 806 can be a resist or other non-etchable material that is not totally consumed during subsequent processing. The dashed lines indicate the future location of trenches.

Figure 8C:
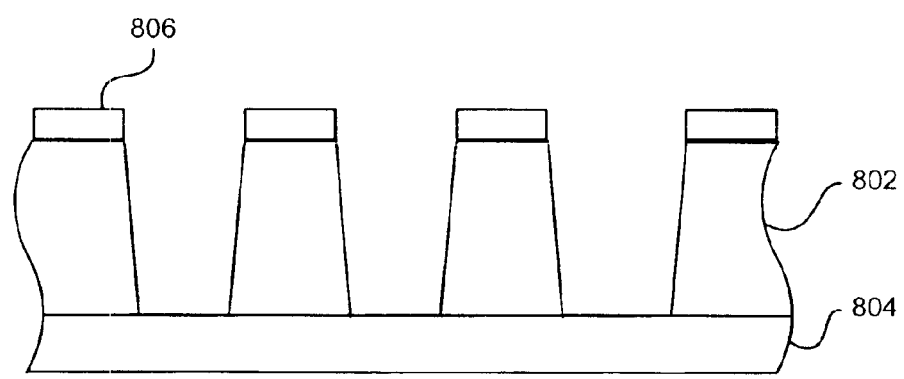

The exposed areas 808 of MSSQ 802 are removed using any suitable process, and preferably using a fluorine-containing plasma, resulting in the trenched structure shown in FIG. 8C. The mask 806 is then preferably removed.

Figure 8D:
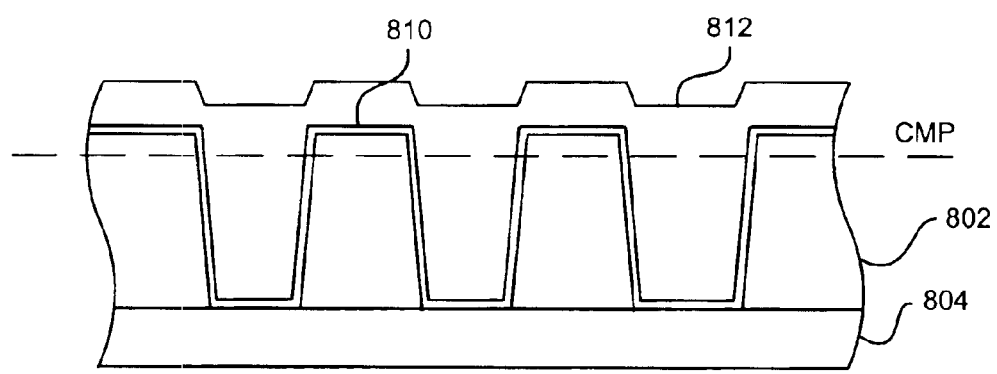
Figure 8E:
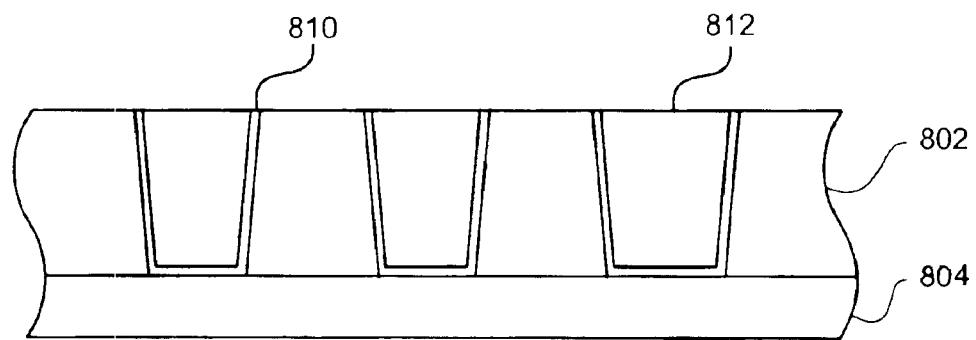

Referring to FIG. 8D, a seed layer 810 is added to the structure. Note that the seed layer may adhere to the walls of the trench and top surface of the MSSQ 802. The seed layer 810 can be, for example, Ta, Cu, etc. Then full film copper 812 or other electrically conductive material is plated to fill the trenches. CMP processing is performed to planarize the structure. FIG. 8E illustrates the final structure.

Note that many of the processing steps described above can be "mixed and matched" in any of the other processes, as will be understood by one skilled in the art.

Figure 9:
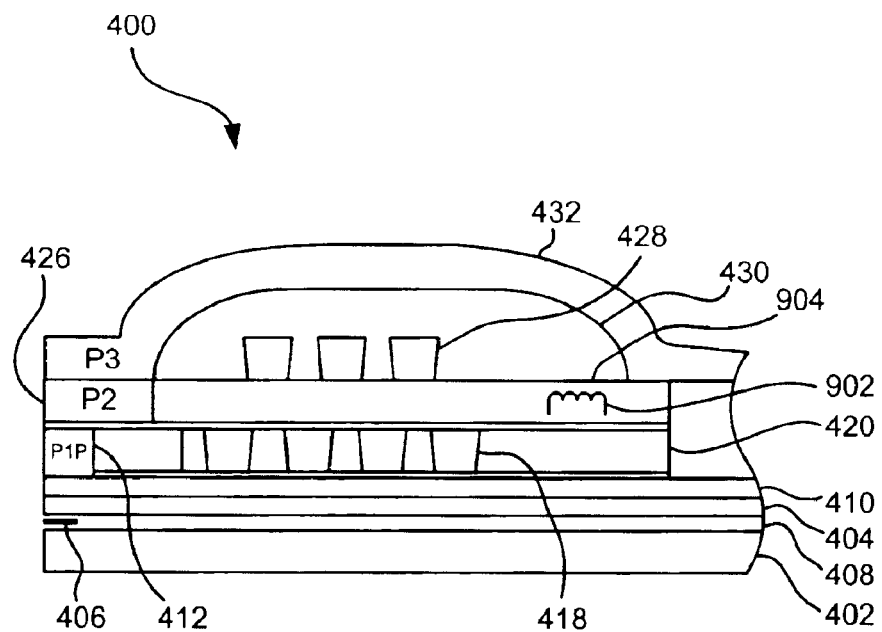
FIG. 9 illustrates the head of FIG. 4 having an independent heating element incorporated therewith.

Other embodiments include creating a resistor surrounded at least on one side thereof by a large thermal expansion polymer to not only cause ABS protrusion by the write head but also by the read head. Similar variations could have the entire coil encapsulated with a large thermal expansion material. FIG. 9 illustrates the head 400 of FIG. 4 having an independent heating element 902 to heat a layer of MSSQ 904. This causes enhanced protrusion in excess of that caused by coil heating.

A similar protrusion effect can be made by placing a resistor elsewhere in the head, such as on the above of the yoke, below the read portion, in the slider, etc. In either case, a thermal expansion takes place which causes the head to protrude.

There has thus been described a new and novel head structure having controlled protrusion, thereby providing the following advantages:

- A larger thermal expansion over all coil insulation between the pedestal and back gap in an inductive head
- More resistance to subsequent oxygen plasma exposure
- Can be planarized in a chemical-mechanical (CMP) polishing step
- Can be reactive ion etched (RIE) for damascene copper coils processing
- Insulation can withstand high temperature processing without the presence of acid in the insulation to interact with copper While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head structure having a read head and a write head, comprising:

a first pole structure;

a second pole structure forming a yoke with the first pole;

a coil structure disposed in the yoke; and a layer of partially cured polymer operatively coupled to at least one of the read and write head.

2. The head structure as recited in claim 1, wherein the partially cured polymer is a silicon-containing polymer.

3. The head structure as recited in claim 2, wherein the partially cured polymer is a silsesquioxane.

4. The head structure as recited in claim 2, wherein the partially cured polymer is selected from a group consisting of methylsilsesquioxane, hydrogen silsesquioxane, and hybrido-organo siloxane polymer.

5. The head structure as recited in claim 4, wherein a portion of an air bearing surface of the head expands outwardly from the head greater than a protrusion of the air bearing surface in the head if hard bake novolac were used in place of the layer of partially cured polymer.

6. The head structure as recited in claim 1, wherein the layer of partially cured polymer surrounds at least a portion of the coil structure.

7. The head structure as recited in claim 1, wherein the layer of partially cured polymer is positioned between the coil structure and an air bearing surface of the head.

8. The head structure as recited in claim 1, wherein the layer of partially cured polymer is positioned substantially in the yoke.

9. The head structure as recited in claim 1, wherein the layer of partially cured polymer is positioned substantially outside the yoke.

10. The head structure as recited in claim 9, wherein the layer of partially cured polymer is positioned between a read element of the head and the yoke.

11. The head structure as recited in claim 9, wherein the layer of partially cured polymer is positioned adjacent to the read head of the head.

12. The head structure as recited in claim 1, further comprising a heating element.

13. The head structure as recited in claim 1, wherein a portion of an air bearing surface of the head expands outwardly from the head in an amount greater than a protrusion of the air bearing surface in the head if hard bake novolac were used in place of the layer of partially cured polymer.

14. The head structure as recited in claim 1, wherein a portion of an air bearing surface of the head expands outwardly from the head in an amount greater than a protrusion of the air bearing surface in the head if alumina were used in place of the layer of partially cured polymer.

15. The head structure as recited in claim 1, wherein the coil structure has been formed by a damascene process.

16. A magnetic head structure having a read head and a write head, comprising:
 a first pole structure;
 a second pole structure forming a yoke with the first pole;
 a coil structure disposed in the yoke; and
 a layer of polymer material operatively coupled to at least one of the read head and write head for providing enhanced protrusion, the polymer material having a coefficient of thermal expansion higher than a coefficient of thermal expansion of fully cured hard bake novolac baked for 11 hours at 225° C.

17. The head structure as recited in claim 16, wherein the layer of polymer material is a partially cured polymer.

18. The head structure as recited in claim 16, wherein the partially cured polymer is a silicon-containing polymer.

19. The head structure as recited in claim 18, wherein the partially cured polymer is a silsesquioxane.

20. The head structure as recited in claim 18, wherein the partially cured polymer is selected from a group consisting of methylsilsesquioxane, hydrogen silsesquioxane, and hybrido-organo siloxane polymer.

21. The head structure as recited in claim 16, wherein the layer of partially cured polymer is positioned substantially in the yoke.

22. The head structure as recited in claim 16, wherein the layer of partially cured polymer is positioned substantially outside the yoke.

23. The head structure as recited in claim 16, further comprising a heating element operatively coupled to the yoke.

24. The head structure as recited in claim 16, wherein a portion of an air bearing surface of the head expands outwardly from the head in an amount of greater than a protrusion of the air bearing surface in the head if hard bake novolac were used in place of the layer of partially cured polymer.

25. The head structure as recited in claim 16, wherein a portion of an air bearing surface of the head expands outwardly from the head in an amount greater than a protrusion of the air bearing surface in the head if alumina were used in place of the layer of partially cured polymer.

26. The head structure as recited in claim 16, wherein the coil structure has been formed by a damascene process.

27. A magnetic head structure having a read head and a write head, comprising:
 a first pole structure;
 a second pole structure forming a yoke with the first pole;
 a coil structure disposed in the yoke; and
 a layer of partially cured silicon-containing polymer operatively coupled to at least one of the read head and the write head.

28. The head structure as recited in claim 27, wherein the partially cured polymer is a silsesquioxane.

29. The head structure as recited in claim 27, wherein the layer of partially cured polymer is positioned substantially in the yoke.

30. The head structure as recited in claim 27, wherein the layer of partially cured polymer is positioned substantially outside the yoke.

31. The head structure as recited in claim 27, further comprising a heating element.

32. The head structure as recited in claim 27, wherein a portion of an air bearing surface of the head expands outwardly from the head in an amount greater than a protrusion of the air bearing surface in the head if hard bake novolac were used in place of the layer of partially cured polymer.

33. The head structure as recited in claim 27, wherein the coil structure has been formed by a damascene process.

34. A magnetic storage system, comprising:
 magnetic media;
 at least one head structure as recited in claim 1;
 a slider for supporting the at least one head; and
 a control unit coupled to the head for controlling operation of the head.

35. A magnetic storage system, comprising:
 magnetic media;
 at least one head structure as recited in claim 16;
 a slider for supporting the at least one head; and
 a control unit coupled to the head for controlling operation of the head.

36. A magnetic storage system, comprising:
 magnetic media;
 at least one head structure as recited in claim 27;
 a slider for supporting the at least one head; and
 a control unit coupled to the head for controlling operation of the head.

* * * * *